United States Patent
Song et al.

(10) Patent No.: US 10,929,220 B2
(45) Date of Patent: Feb. 23, 2021

(54) TIME SERIES RETRIEVAL FOR ANALYZING AND CORRECTING SYSTEM STATUS

(71) Applicant: NEC Laboratories America, Inc., Princeton, NJ (US)

(72) Inventors: Dongjin Song, Princeton, NJ (US); Ning Xia, Plainsboro, NJ (US); Haifeng Chen, West Windsor, NJ (US)

(73) Assignee: NEC CORPORATION

( * ) Notice: Subject to any disclaimer, the term of this patent is extended or adjusted under 35 U.S.C. 154(b) by 176 days.

(21) Appl. No.: 16/245,740

(22) Filed: Jan. 11, 2019

(65) Prior Publication Data

US 2019/0243739 A1 Aug. 8, 2019

Related U.S. Application Data

(60) Provisional application No. 62/627,922, filed on Feb. 8, 2018.

(51) Int. Cl.
| | |
|---|---|
| *G06F 11/00* | (2006.01) |
| *G06F 11/07* | (2006.01) |
| *G06F 11/34* | (2006.01) |
| *G06N 7/08* | (2006.01) |
| *G06N 3/02* | (2006.01) |

(52) U.S. Cl.
CPC ...... *G06F 11/0793* (2013.01); *G06F 11/3419* (2013.01); *G06F 11/3452* (2013.01); *G06N 3/02* (2013.01); *G06N 7/08* (2013.01)

(58) Field of Classification Search
CPC ........ G06N 3/02; G06N 7/08; G06F 11/0793; G06F 11/3447; G06F 11/3452
See application file for complete search history.

(56) References Cited

U.S. PATENT DOCUMENTS

| | | | |
|---|---|---|---|
| 2018/0174062 A1* | 6/2018 | Simo | G06N 3/08 |
| 2018/0225166 A1* | 8/2018 | Maya | G06F 11/3447 |
| 2019/0205232 A1* | 7/2019 | Ayyagari | G06F 11/0793 |

OTHER PUBLICATIONS

Zhengping Che et al., "Deep Computational Phenotyping. In Proceedings of the 21st ACM SIGKDD Conference on Knowledge Discovery and Data Mining", KDD '15, Aug. 10-13, 2015, Sydney, NSW, Australia.

(Continued)

*Primary Examiner* — Michael Maskulinski
(74) *Attorney, Agent, or Firm* — Joseph Kolodka (57) ABSTRACT

Methods and systems for detecting and correcting anomalous behavior include generating a joint binary embedding of each of a set of historical time series sequences. A joint binary embedding of a recent time series sequence is generated. A ranked list of the plurality of historical time series sequences is generated according to respective similarities of each historical time series sequence to the recent time series sequence based on the respective joint binary embeddings of each. Anomalous behavior of a system associated with the recent time series sequence is determined according to a label of a top-ranked historical time series sequence in the ranked list. A corrective action is performed to correct the anomalous behavior.

18 Claims, 6 Drawing Sheets

(56) References Cited

OTHER PUBLICATIONS

Andrea Frome et al., "DeViSE: A Deep Visual-Semantic Embedding Model", In Proceedings of Neural Information Processing Systems, In Advances in Neural Information Processing Systems 26: 27th Annual Conference on Neural Information Processing Systems 2013, Dec. 5-8, 2013, Lake Tahoe, Nevada.
Guofei Jiang et al., "Efficient and Scalable Algorithms for Inferring Likely Invariants in Distributed Systems", IEEE Transactions on Knowledge and Data Engineering, vol. 19, No. 11, Nov. 2007.
Patrick Ross et al., "An Examination of Multivariate Time Series Hashing with Applications to Health Care", IEEE International Conference on Data Mining, Shenzhen, Dec. 2014.
Jin Shieh et al., "iSAX: Indexing and Mining Terabyte Sized Time Series", KDD '08 Proceedings of the 14th ACM SIGKDD international conference on Knowledge discovery and data mining, Aug. 24-27, 2008, Las Vegas, Nevada.
Dongjin Song et al., "Deep r-th Root Rank Supervised Joint Binary Embedding for Multivariate Time Series Retrieval", KDD '18 Proceedings of the 24th ACM SIGKDD International Conference on Knowledge Discovery & Data Mining, Aug. 19-23, 2018, London, United Kingdom.
Yunyue Zhu et al., "StatStream: Statistical Monitoring of Thousands of Data Streams in Real Time", VLDB '02: Proceedings of the 28th International Conference on Very Large Databases, Aug. 20-23, 2002, Hong Kong, China.

\* cited by examiner

TIME SERIES RETRIEVAL FOR ANALYZING AND CORRECTING SYSTEM STATUS

RELATED APPLICATION INFORMATION

This application claims priority to U.S. Application Ser. No. 62/627,922, filed on Feb. 8, 2018, incorporated herein by reference herein its entirety.

BACKGROUND

Technical Field

The present invention relates to multivariate time series retrieval in complex systems and, more particularly, to rank supervised joint binary embedding for such retrieval to determine and correct system status.

Description of the Related Art

Multivariate time series data is common across many practical applications, including for example power plant monitoring, health care, wearable devices, automobile monitoring, internet of things applications, etc. The retrieval of multivariate time series characterizes how one obtains relevant time series segments from historical data when given a current multivariate time series segment. In other words, finding a matching time series in the historical data, using a particular known time series, can be particularly challenging due to the need to encode temporal dynamics as well as interactions between different sets of time series.

SUMMARY

A method for detecting and correcting anomalous behavior include generating a joint binary embedding of each of a set of historical time series sequences. A joint binary embedding of a recent time series sequence is generated. A ranked list of the plurality of historical time series sequences is generated according to respective similarities of each historical time series sequence to the recent time series sequence based on the respective joint binary embeddings of each. Anomalous behavior of a system associated with the recent time series sequence is determined according to a label of a top-ranked historical time series sequence in the ranked list. A corrective action is performed to correct the anomalous behavior.

A system for detecting and correcting anomalous behavior includes a joint embedding module that has a processor configured to generate a joint binary embedding of each of a plurality of historical time series sequences and to generate a joint binary embedding of a recent time series sequence. A ranking module is configured to generate a ranked list of the plurality of historical time series sequences according to respective similarities of each historical time series sequence to the recent time series sequence based on the respective joint binary embeddings of each. A correction module is configured to determine anomalous behavior of a system associated with the recent time series sequence according to a label of a top-ranked historical time series sequence in the ranked list and to perform a corrective action to correct the anomalous behavior.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention use $r^{th}$-root rank supervised joint binary embedding to perform multivariate time series retrieval. Given a raw multivariate time series segment, the present embodiments employ long short term memory (LSTM) units to encode the temporal dynamics and convolutional neural networks (CNNs) to encode the correlations between different pairs of time series. The temporal dynamics and the correlations in raw time series segments are represented with two separate feature vectors. A joint binary embedding is generated to incorporate both the temporal dynamics and the correlations. An $r^{th}$-root ranking loss is used to optimize the precision at the top of a Hamming distance ranked list to generate an output.

The ranking loss may also force misaligned segments to share similar binary embeddings if they belong to a same class. To obtain an embedding function, some embodiments of the present invention relax the original discrete objective with a continuous replacement and use a stochastic gradient descent to optimize the replacement objective.

Figure 1:
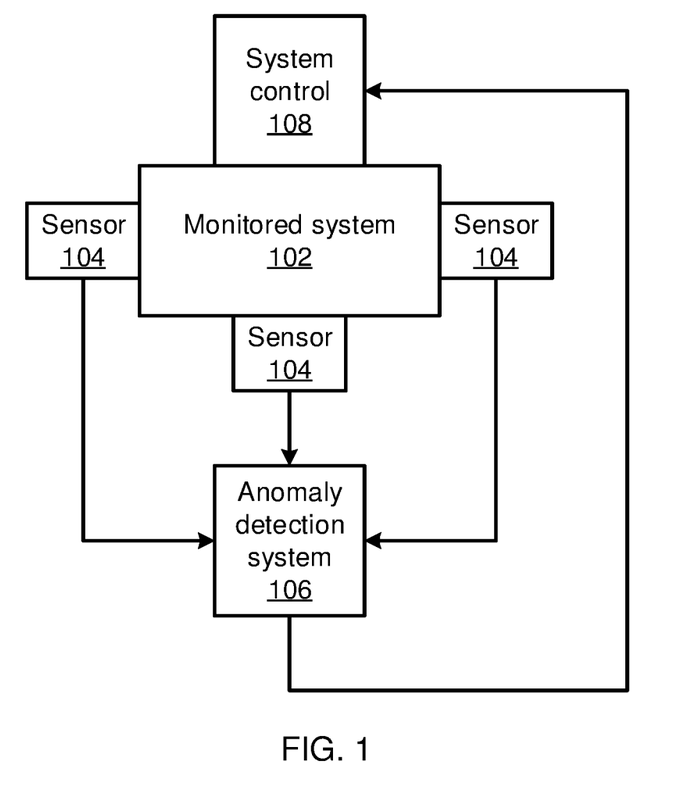
FIG. 1 is a block diagram of a monitored system with anomaly detection and correction in accordance with an embodiment of the present invention.

Referring now to FIG. 1, an anomaly detection system 106 is shown in the context of a monitored system 102. The monitored system 102 can be any appropriate system, including physical systems such as manufacturing lines and physical plant operations, electronic systems such as computers or other computerized devices, wearable devices, vehicles, Internet of Things devices, and software systems such as operating systems and applications.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats. It is specifically contemplated that the sensors 104 may generate time series data, represented as an ordered list of records that may or may not have associated timestamps indicating a time at which each respective record was generated.

The sensors 104 may transmit the logged sensor information to an anomaly detection system 106 by any appropriate communications medium and protocol, including wireless and wired communications. The anomaly detection system 106 compares a sequence of recently measured time series data to a body of previously recorded sets of data and retrieves one or more matching historical instances. These retrieved instances may have associated labels that describe conditions or activities of the monitored system 102 during time periods associated with the retrieved instances. In some cases, the label of a retrieved instance can indicate that the monitored system 102 is behaving in an anomalous or otherwise disadvantageous way.

Once anomalous behavior has been detected, the anomaly detection system 106 communicates with a system control unit 108 to alter one or more parameters of the monitored system 102 to correct the anomalous behavior. Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The anomaly detection system 106 thereby automatically corrects or mitigates the anomalous behavior.

Given a multivariate time series segment, for example n time series with $X=(x^1, \ldots, x^n)^T=(x_1, \ldots, X_T) \in \mathbb{R}^{n \times T}$, where T is the length of a window size, the term $x^k = (x_1^k, \ldots, x_T^k)^T \in \mathbb{R}^T$ represents a time series of length t. The term, $x_t=(x_t^1, \ldots, x_t^k) \in \mathbb{R}^n$ represents a vector of n input series at a particular time t. In addition, the Frobenius norm is denoted as $\|\cdot\|_F$ and the Hamming norm of a vector x is denoted as $\|x\|_H$. The Hamming norm is the number of non-zero entries in a vector. The $\ell_1$ norm of a vector x is denoted as $\|x\|_1$ and provides the sum of absolute values of the entries in x.

Given a multivariate time series segment $X_q \in \mathbb{R}^{n \times T}$, which represents a slice of n time series that lasts T time steps, the present embodiments find the most similar time series segments in a set of historical database. This is expressed as:

$$\arg\min_{X_p \in \mathcal{D}} \mathcal{S}(X_q, X_p)$$

where $\mathcal{D}=\{X_p\}$ is a collection of segments, p denotes an index for the $p^{th}$ segment for all $1 \leq p \leq N$, N denotes the total number of segments in the collection, and $\mathcal{S}(\cdot)$ represents a similarity measure function.

Figure 2:
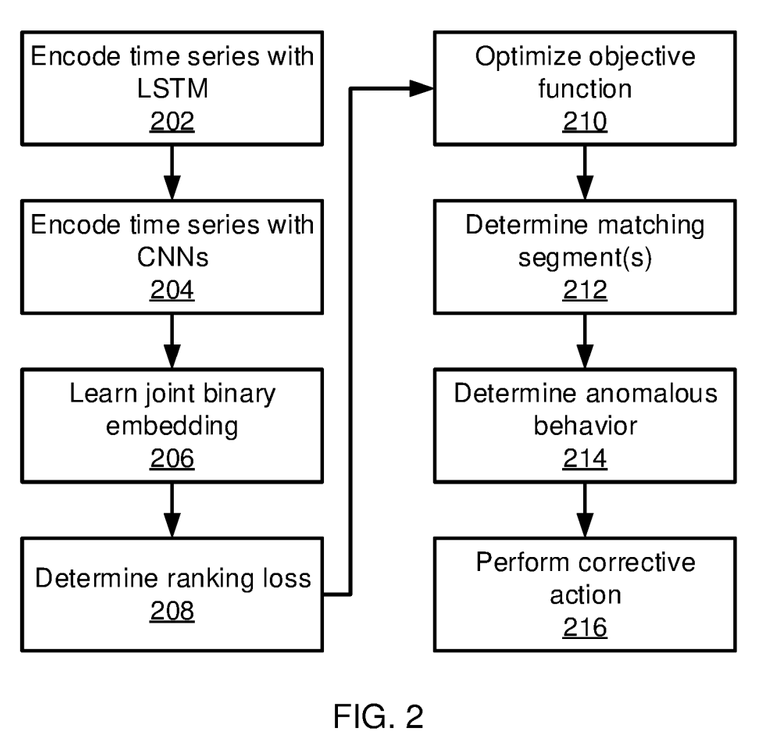
FIG. 2 is a block/flow diagram of detecting and correcting anomalous behavior in a monitored system in accordance with an embodiment of the present invention.

Referring now to FIG. 2, a method for detecting and correcting anomalous behavior is shown. To perform multivariate time series retrieval, the present embodiments obtain a representation of the multivariate raw time series segments which captures the temporal dynamics. Given a multivariate time series segment $X=(x_1, \ldots, x_T)$, a mapping from X to h is shown as $h=\mathcal{F}(X)$, where $h \in \mathbb{R}^m$ is the feature vector, m is the dimension of h, and $\mathcal{F}$ is a non-linear mapping function.

Block 202 employs LSTM units to implement $\mathcal{F}$ to capture the temporal dynamics, as well as long-term dependencies, in X. In an LSTM unit, a cell state sums activities over time, which can overcome the problem of vanishing gradients and can better capture the long-term dependencies of a time series. Each LSTM unit has a memory cell with a state $s_t$ at time t. Access to the memory cell is controlled by three sigmoid gates: a forget gate $f_t$, an input gate $i_t$, and an output gate $o_t$. The update of an LSTM unit can be summarized as:

$$f_t=\sigma(W_f[h_{t-1};x_t]+b_f)$$

$$i_t=\sigma(W_i[h_{t-1};x_t]+b_i)$$

$$o_t=\sigma(W_t[h_{t-1};x_t]+b_f)$$

$$s_t=f_t\odot s_{t-t}+i_t\odot \tanh(W_s[h_{t-1};x_t]+b_s)$$

$$h_t=o_t \tanh(s_t)$$

where $[h_{t-1}; x_t] \mathbb{R}^{m+n}$ is a concatenation of the previous state $h_{t-1}$ and the current input $x_t$. The terms $W_f, W_i, W_o, W_s \in \mathbb{R}^{m \times (m+n)}$ and $b_f, b_i, b_o, b_s \in \mathbb{R}^m$ are parameters that are learned during training. The functions σ and ⊙ are a logistic sigmoid function and an element-wise multiplication operator (e.g., the Hadamard product), respectively.

Block 204 uses CNNs to represent the correlations between different pairs of time series in a multivariate time series segment. It should be understood that blocks 202 and 204 can be performed in any order or can be performed simultaneously. Block 204 constructs an n×n correlation map using, e.g., Person's correlation coefficient. Given two time series, $x^i=(x_1^i, \ldots, x_T^i)^T \in \mathbb{R}^T$ and $x^j=(_1^j, \ldots, x_T^j)^T \in \mathbb{R}^T$, the Pearson correlation coefficient can be calculated as:

$$c_i^j = \frac{\sum_{k=1}^{T}(x_k^i - \bar{x}^i)(x_k^j - \bar{x}^j)}{\sqrt{\sum_{k=1}^{T}(x_k^i - \bar{x}^i)^2 \sum_{k=1}^{T}(x_k^j - \bar{x}^j)^2}}$$

where $\bar{x}^i$ and $\bar{x}^j$ denote sample means of the two time series.

CNNs are used in block 204 to produce a compact representation of the correlation map $C \in \mathbb{R}^{n \times n}$. An exemplary CNN architecture includes four convolutional layers and two fully connected layers. Each convolutional layer is a three-dimensional array of size h×w×d, where h and w are spatial dimensions and d is a feature or channel dimension, followed by a batch normalization and rectifier linear unit. The fully connected layers transform convolutional feature maps to a vector and project it to a fixed dimension m. It should be understood that this CNN architecture is purely exemplary and should not be construed as limiting in any way. The output of the CNN is $l \in \mathbb{R}^m$ and is used to encode the correlations between different pairs of time series in a multivariate time series segment.

Given the representation for a raw multivariate time series segment $h_T$ as well as the representation for the correlations between different pairs of time series in the same segment l, block 206 concatenates the representations together as $y=[h_T;1] \in \mathbb{R}^{2m}$ and learns a joint binary embedding that includes a group of mappings $\{\mathcal{H}_c(y)\}_{c=1}^v$ such that a 2m-dimensional floating-point input $y \in \mathbb{R}^{2m}$ is compressed into a v-bit binary code $[\mathcal{H}_1(y), \ldots, \mathcal{H}_v(y)]^T \in \mathbb{H}^v = \{1, -1\}^v$. This represents a binary embedding or hash function and can be formulated as:

$$\mathcal{H}_c(y) = \text{sgn}(\mathcal{F}_c(y)), c=1, \ldots, v$$

where sgn(•) is the sign function that returns 1 if the input variable is greater than 0 and returns −1 otherwise and where $\mathcal{F}_c: \mathbb{R}^{2m} \to \mathbb{R}$ is a proper prediction function. A variety of mathematical forms for $\mathcal{F}_c$ (e.g., linear and nonlinear) can be utilized to serve to specific data domains and practical applications. The present embodiments focus on a linear prediction function, but it should be understood that any appropriate prediction function can be used instead. Thus, $\mathcal{F}_c(y) = w_c^T y + b_c$, where $w_c \in \mathbb{R}^{2m}$ and $b_c \in \mathbb{R}$. The bias term $b_c = -w_c^T u$ by using a mean vector $u = \Sigma_{i=1}^n y_i/n$, which makes each generated binary bit $\{_c(y)\}_{c=1}^v$ for $c \in [1:v]$ be balanced and thus exhibit maximum entropy. The whole binary embedding function H is further defined to include the functionality of v individual binary embedding functions $\{H_c\}_{c=1}^v$:

$$\mathcal{H}(y, W) = \text{sgn}(W^T(y-u))$$

which can be paramterized by a matrix $W=[w_1, \ldots, w_v] \in \mathbb{R}^{2m \times v}$. The sign function is applied in an element-wise fashion.

Block 208 determines a ranking loss to leverage relative segment similarities in the form of triplets $\mathcal{D}_{triplet} = \{X_q, X_i, X_j\}$, where each segment pair $\{X_q, X_i\}$ in the triplet is more similar than the segment pair $\{X_q, X_j\}$, such that $X_q$ and $X_i$ are in the same class and $X_q$ and $X_1$ are in different classes. These relative similar relationships are preserved within the Hamming space by virtue of a good binary embedding function $\mathcal{H}(\bullet)$, which makes the Hamming distance between embeddings $\mathcal{H}(y_q)$ and $\mathcal{H}(y_i)$ smaller than the Hamming distance between embeddings $\mathcal{H}(y_q)$ and $\mathcal{H}(y_j)$.

If $y_q$ denotes a query segment, $y_i$ denotes a similar segment, and $y_j$ denotes a dissimilar segment, then the "rank" of $y_i$ with respect to the query $y_q$ can be defined as the number of dissimilar segments $y_j$ which are closer to the query $y_q$ than $y_i$ is within the projected Hamming space. Therefore, the rank can be defined as:

$$R(y_q, y_i) = \sum_j \mathcal{I}(\|\mathcal{H}(y_q) - \mathcal{H}(y_j)\|_H \leq \|\mathcal{H}(y_q) - \mathcal{H}(y_i)\|_H)$$

where $\mathcal{I}(\bullet)$ is an indicator function which returns 1 if the condition in the parenthesis is satisfied and returns 0 otherwise. The function $R(y_q, y_i)$ explicitly measures the number of the incorrectly ranked dissimilar segments $y_j$ which are closer to the query $y_q$ than the similar segment $y_i$ in terms of Hamming distance. $R(y_q, y_i)$ therefore indicates the position of $y_i$ in a Hamming distance ranked list with respect to the query $y_q$.

The $r^{th}$ root ranking loss explicitly optimizes the search precision at top positions of the ranked list and is defined as:

$$\mathcal{L}(R(y_q, y_i)) = \sqrt[r]{R(y_q, y_i)} = R^{\frac{1}{r}}(y_q, y_i)$$

where r>1. This loss penalizes the segments that are incorrectly ranked at the top of a Hamming-distance ranked list more than those at the bottom. This is because the increment of $\mathcal{L}(R)$ gradually decreases as R increases linearly. $\mathcal{L}(R)$ is a one-to-one monotonic, increasing function with first order derivative $\mathcal{L}'(r)$ that is larger than zero and a second order derivative $\mathcal{L}''(R)$ that is smaller than zero. Since $\mathcal{L}(R)$ can be seen as an integral of its gradient, then $\mathcal{L}'(R)>0$ preserves the rank by penalizing R more severely at the top than at the bottom of the list.

The learning objective is formulated as:

$$\mathcal{O}(\mathcal{D}_{triplet}, W) = \sum_q \sum_i R^{\frac{1}{r}}(y_q, y_i) + \frac{\lambda}{2}\|W\|_F^2$$

where the first term is the ranking loss, the second term enforces regularization, and $\lambda > 0$ is a positive parameter controlling a tradeoff between the ranking loss and the regularization term. The parameter r>1 determines to what degree the penalization is put on top of the ranking list, such that a larger r penalizes terms more severely. By optimizing this objective function with respect to W, the precision at top positions of the Hamming distance ranked list is optimized.

Although the raking loss is continuous and differentiable with respect to R, the objective function above is still difficult to optimize. This is because the binary embedding function is a discrete mapping and because the Hamming norm lies in a discrete space. Therefore, block 210 relaxes the original discrete objective to a continuous and differentiable surrogate before performing optimization. The target binary embedding function $\mathcal{H}(y)$ can be relaxed as:

$$\mathcal{H}(y) = \tanh(W^T(y-u))$$

which is continuous and differentiable. The tanh(•) function is a good approximation of the sgn(•) function because it transforms the value in the parenthesis to be between −1 and +1. The Hamming norm is relaxed to the $\ell_1$ norm, which is conv ex. The indicator function is relaxed with the sigmoid function. The indicator function can then be approximated with:

$$\mathcal{I}(\|\mathcal{H}(y_q) - \mathcal{H}(y_j)\|_H \leq \|\mathcal{H}(y_q) - \mathcal{H}(y_i)\|_H) \approx$$
$$\sigma(\|\mathcal{H}(y_q) - \mathcal{H}(y_j)\|_H \leq \|\mathcal{H}(y_q) - \mathcal{H}(y_i)\|_H)$$

where $$\sigma(z) = \frac{1}{1+e^{-z}}$$

is the sigmoid function and u is the mean vector, described above.

Based on these relaxations, the objective function can be approximated as:

$$\overline{\mathcal{O}}(\mathcal{D}_{triplet}, W) = \sum_q \sum_i \overline{R}^{(\frac{1}{r})}(y_q, y_i) + \frac{\lambda}{2}\|W\|_F^2$$

where $\overline{R}(y_q, y_i)$ is a soft-approximated rank of $y_i$ with respect to the query $y_q$ and is given by:

$$\overline{R}(y_q, y_i) = \sum_j \sigma(V_{qi} - V_{qj})$$

where $V_{qi}$ is expressed as:

$$V_{qi} = \|\mathcal{H}(y_q) - \mathcal{H}(y_i)\|_1$$

and $V_{qj}$ is expressed as:

$$V_{qj} = \|\mathcal{H}(y_q) - \mathcal{H}(y_j)\|_1$$

A stochastic gradient descent is derived to optimize the objective function. A query $X_q$ is selected randomly with a similar segment Xi/ Then $X_q$ and $X_i$ are fixed and s different $X_j$ are drawn to form a set of triplets $\{X_q, X_i, X_j\}_{j=1}^s$, where the total choices for j is M. Assuming the that the violated examples are uniformly distributed, then $\overline{R}(y_q, y_i)$ can be approximated with $$\left\lfloor \frac{M}{s} \right\rfloor \cdot \sum_{j=1}^s \sigma(V_{qi} - V_{qj}),$$

where [•] is the floor function.

The objective function is thereby further approximated with:

$$\overline{\mathcal{O}}(\mathcal{D}_{triplet}, W) = \left(\left\lfloor \frac{M}{s} \right\rfloor \cdot \sum_{j=1}^s \sigma(V_{qi} - V_{qj})\right)^{\frac{1}{r}} + \frac{\lambda}{2}\|W\|_F^2$$

The associated gradient is given by:

$$\frac{\partial \overline{\mathcal{O}}(\mathcal{D}_{triplet}, W)}{\partial W} =$$

$$\lambda W + \frac{1}{r}\left\lfloor \frac{M}{s} \right\rfloor \left[\sum_{j=1}^s \sigma(V_{qi} - V_{qj})\right]^{\frac{1}{r}-1} \sum_{j=1}^s \sigma(V_{qi} - V_{qj})\sigma(-V_{qi} + V_{qj}) \cdot$$

$$\{(y_q - u)[\text{sgn}(\mathcal{H}(y_q) - \mathcal{H}(y_i)) \odot (1 - \mathcal{H}^2(y_q))]^T -$$
$$(y_i - u)[\text{sgn}(\mathcal{H}(y_q) - \mathcal{H}(y_i)) \odot (1 - \mathcal{H}^2(y_i))]^T -$$
$$(y_q - u)[\text{sgn}(\mathcal{H}(y_q) - \mathcal{H}(y_j)) \odot (1 - \mathcal{H}^2(y_q))]^T +$$
$$(y_j - u)[\text{sgn}(\mathcal{H}(y_q) - \mathcal{H}(y_j)) \odot (1 - \mathcal{H}^2(y_j))]^T\}$$

Based on this gradient, backpropagation over the entire network can be performed using minibatch stochastic gradient descent with an Adam optimizer to optimize the network parameters. In this manner, block 210 optimizes an approximation of the objective function.

The result is a ranked list of segments, with the most similar segments being at the top of the list. Block 212 then determines matching segments from the list. In some embodiments, block 212 selects the most similar segment (e.g., the top-ranked segment) from the list as a matching segment. In other embodiments, block 212 may select multiple matching segments, for example selecting a top n matching segments or selecting a number of segments according to a similarity threshold.

Block 214 determines a label of the matching segments and determines whether the segments identify anomalous behavior. In other embodiments, block 214 can select for any kind of system behavior. For example, on a wearable device, block 214 can determine what kind of physical user activity the current sensor information indicates. Other types of detected behavior can include a computer security intrusion event, dangerous environmental conditions, medical conditions, etc. Block 216 then takes a corrective action based on the determination of block 214. For example, corrective actions responsive to anomalous behavior may include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. Block 216 thereby automatically corrects or mitigates the anomalous behavior.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present embodiments employ artificial neural networks (ANNs) to perform certain operations. An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Figure 3:
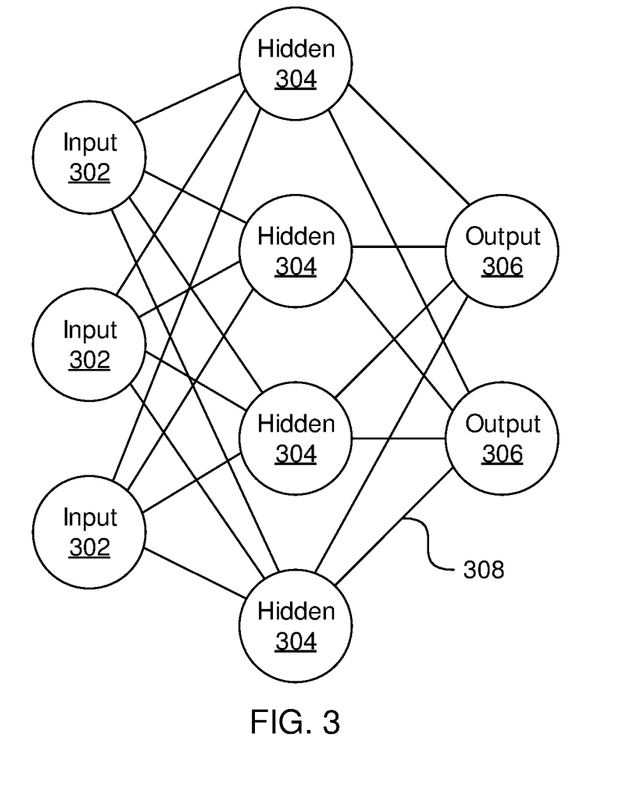
FIG. 3 is a diagram of an exemplary neural network in accordance with an embodiment of the present invention.

Referring now to FIG. 3, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted and these weighted inputs are then processed by the hidden neurons 304 according to some function in the hidden neurons 304, with weighted connections 308 between the layers. There may be any number of layers of hidden neurons 304, and as well as neurons that perform different functions. There exist different neural network structures as well, such as convolutional neural network, maxout network, etc. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "feed-back" computation, where the hidden neurons 304 and input neurons 302 receive information regarding the error propagating backward from the output neurons 306. Once the backward error propagation has been completed, weight updates are performed, with the weighted connections 308 being updated to account for the received error. This represents just one variety of ANN.

Figure 4:
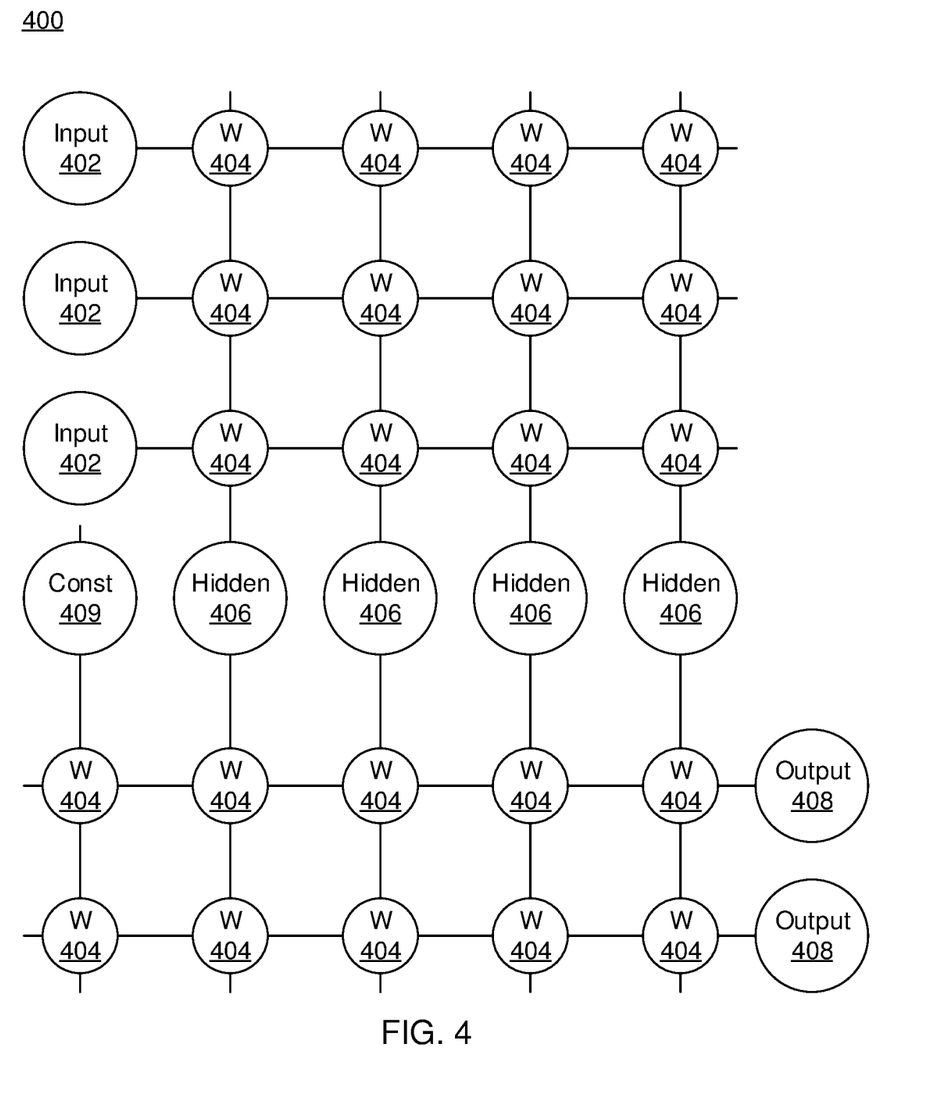
FIG. 4 is a diagram of an exemplary neural network architecture in accordance with an embodiment of the present invention.

Referring now to the drawings in which like numerals represent the same or similar elements and initially to FIG. 4, an ANN architecture 400 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection. In this way, the general ANN structure shown can be adapted to the LSTM and CNN networks described above.

During feed-forward operation, a set of input neurons 402 each provide an input signal in parallel to a respective row of weights 404. In the hardware embodiment described herein, the weights 404 each have a respective settable value, such that a weight output passes from the weight 404 to a respective hidden neuron 406 to represent the weighted input to the hidden neuron 406. In software embodiments, the weights 404 may simply be represented as coefficient values that are multiplied against the relevant signals. The signals from each weight adds column-wise and flows to a hidden neuron 406.

The hidden neurons 406 use the signals from the array of weights 404 to perform some calculation. The hidden neurons 406 then output a signal of their own to another array of weights 404. This array performs in the same way, with a column of weights 404 receiving a signal from their respective hidden neuron 406 to produce a weighted signal output that adds row-wise and is provided to the output neuron 408.

It should be understood that any number of these stages may be implemented, by interposing additional layers of arrays and hidden neurons 406. It should also be noted that some neurons may be constant neurons 409, which provide a constant output to the array. The constant neurons 409 can be present among the input neurons 402 and/or hidden neurons 406 and are only used during feed-forward operation.

During back propagation, the output neurons 408 provide a signal back across the array of weights 404. The output layer compares the generated network response to training data and computes an error. The error signal can be made proportional to the error value. In this example, a row of weights 404 receives a signal from a respective output neuron 408 in parallel and produces an output which adds column-wise to provide an input to hidden neurons 406. The hidden neurons 406 combine the weighted feedback signal with a derivative of its feed-forward calculation and stores an error value before outputting a feedback signal to its respective column of weights 404. This back propagation travels through the entire network 400 until all hidden neurons 406 and the input neurons 402 have stored an error value.

During weight updates, the stored error values are used to update the settable values of the weights 404. In this manner the weights 404 can be trained to adapt the neural network 400 to errors in its processing. It should be noted that the three modes of operation, feed forward, back propagation, and weight update, do not overlap with one another.

Figure 5:
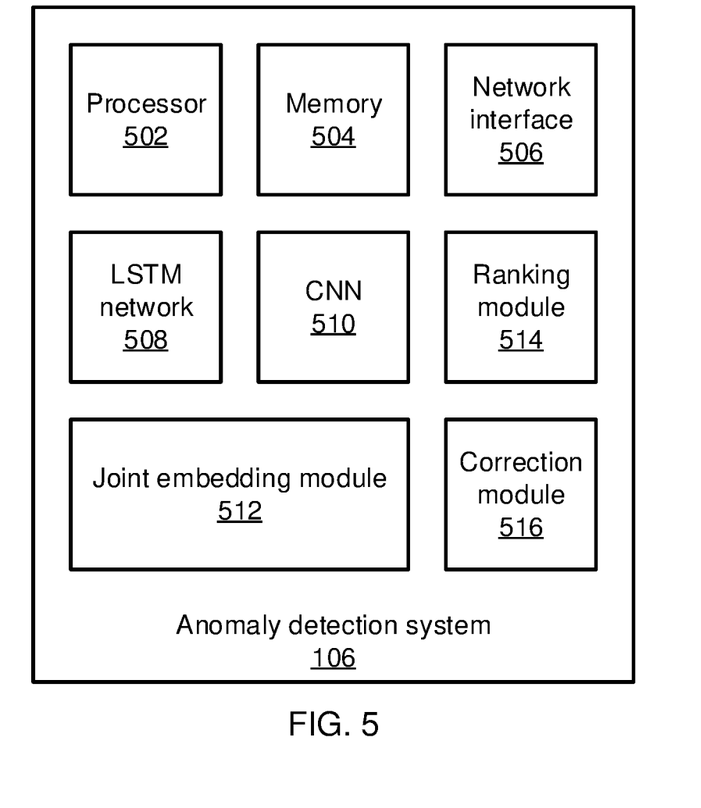
FIG. 5 is a block diagram of an anomaly detection system configured to detect and correct anomalous behavior in a monitored system in accordance with an embodiment of the present invention.

Referring now to FIG. 5, an anomaly detection and correction system 106 is shown. The system 106 includes a hardware processor 502 and memory 504. A network interface 506 receives information from sensors 104 and transmits control information to system control 108 by any appropriate wired or wireless communications medium and by any appropriate protocol. The system 106 further includes one or more functional modules that may, in some embodiments, be implemented as software that is stored in memory 504 and executed on the hardware processor 502. In other embodiments, one or more of the functional modules may be implemented as one or more discrete hardware components in the form of, e.g., application specific integrated chips or field programmable gate arrays.

A LSTM network unit 508 captures the temporal dynamics of time series sequences, while a CNN 510 captures the correlations between different pairs of time series, coming from different sensors 104. A joint embedding module 512 generates a joint binary embedding using the outputs of the LSTM network unit 508 and the CNN 510. A ranking module 514 generates a list of matching time series sequences that is ranked according to similarity to a recent time series from the sensors 104.

Correction module 516 uses the ranked list to determine the present condition of the monitored system 102 by assessing labels associated with the similar sequences. In this manner, correction module 516 identifies abnormal behavior. Correction module 516 then determines an appropriate corrective action to take in response to the abnormal behavior and performs that action.

Figure 6:
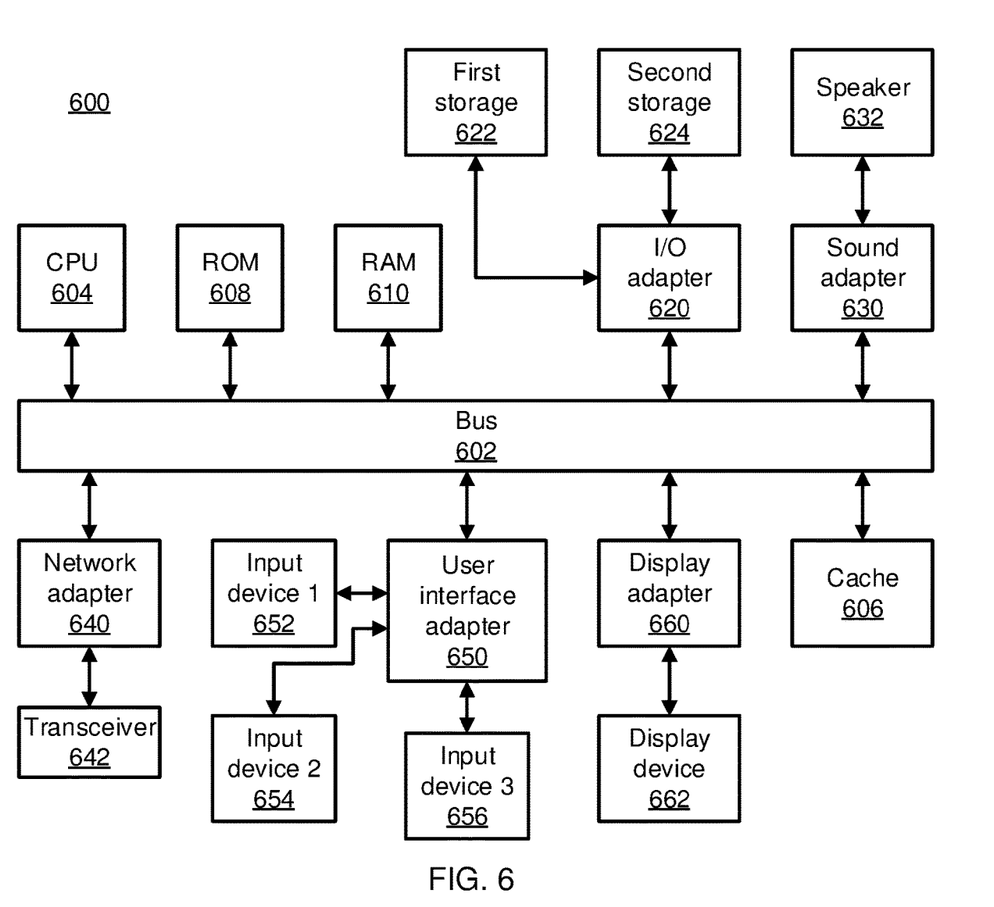
FIG. 6 is a block diagram of a processing system in accordance with an embodiment of the present invention.

Referring now to FIG. 6, an exemplary processing system 600 is shown which may represent the anomaly detection system 106. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for detecting and correcting anomalous behavior, comprising:
  generating a joint binary embedding of each of a plurality of historical time series sequences;
  generating a joint binary embedding of a recent time series sequence;
  generating a ranked list of the plurality of historical time series sequences according to respective similarities of each historical time series sequence to the recent time series sequence based on the respective joint binary embeddings of each;
  determining anomalous behavior of a system associated with the recent time series sequence according to a label of a top-ranked historical time series sequence in the ranked list; and
  performing a corrective action to correct the anomalous behavior.

2. The method of claim 1, wherein generating a joint binary embedding of the plurality of historical time series sequences and of the recent time series sequence comprises:
  encoding a time series sequence with a long short term memory unit to generate a first representation of temporal dynamics; and
  encoding pairs of time series sequences with convolutional neural networks to generate second representations for correlations between different pairs of time series within a same time segment.

3. The method of claim 2, wherein generating a joint binary embedding of the plurality of historical time series sequences and of the recent time series sequence further comprises:
  concatenating the representations; and
  mapping the concatenation to a value between 1 and −1.

4. The method of claim 1, wherein generating the ranked list comprises determining a similarity of each of the plurality of historical time series sequences to the recent time series sequence according to a Hamming distance between the respective joint binary embeddings.

5. The method of claim 1, wherein generating the ranked list comprises optimizing an objective function that includes a ranking loss term and a regularization term.

6. The method of claim 5, wherein optimizing the objective function comprises optimizing an approximated objective function:

$$\overline{\mathcal{O}}(\mathcal{D}_{triplet}, W) = \left( \left\lfloor \frac{M}{s} \right\rfloor \cdot \sum_{j=1}^{s} \sigma(V_{qi} - V_{qj}) \right)^{\frac{1}{r}} + \frac{\lambda}{2} \|W\|_F^2$$

where $D_{triplet}$ is a triplet of segments, W is a parameter matrix, M is a total of choices of triplets, s is a number of different segments in the triplets, $\Sigma^s_{j=1} \sigma(V_{qi}-V_{qj})$ is a soft-approximated rank of historical time series yi with respect to query $y_q$, r is a penalization parameter, and λ is a parameter controlling a tradeoff between ranking loss and regularization.

7. The method of claim 5, wherein the objective function is an approximate objective function base on a stochastic gradient descent.

8. The method of claim 1, wherein each time series sequence represents a set of sensor values ordered by time of recording.

9. The method of claim 1, wherein the corrective action is selected from the group consisting of changing a security setting for an application or hardware component of a monitored system, changing an operational parameter of an application or hardware component of the monitored system, halting or restarting an application of the monitored system, halting or rebooting a hardware component of the monitored system, changing an environmental condition of the monitored system, and changing status of a network interface of the monitored system.

10. A system for detecting and correcting anomalous behavior, comprising:
a joint embedding module comprising a processor configured to generate a joint binary embedding of each of a plurality of historical time series sequences and to generate a joint binary embedding of a recent time series sequence;
a ranking module configured to generate a ranked list of the plurality of historical time series sequences according to respective similarities of each historical time series sequence to the recent time series sequence based on the respective joint binary embeddings of each; and
a correction module configured to determine anomalous behavior of a system associated with the recent time series sequence according to a label of a top-ranked historical time series sequence in the ranked list and to perform a corrective action to correct the anomalous behavior.

11. The system of claim 10, wherein the joint embedding module is further configured to encode a time series sequence with a long short term memory unit, to generate a first representation of temporal dynamics, and to encode pairs of time series sequences with convolutional neural networks, to generate second representations for correlations between different pairs of time series within a same time segment.

12. The system of claim 11, wherein the joint embedding module is further configured to concatenate the representations, and to map the concatenation to a value between 1 and −1.

13. The system of claim 10, wherein the ranking module is further configured to determine a similarity of each of the plurality of historical time series sequences to the recent time series sequence according to a Hamming distance between the respective joint binary embeddings.

14. The system of claim 10, wherein the ranking module is further configured to optimize an objective function that includes a ranking loss term and a regularization term.

15. The system of claim 14, wherein the ranking module is further configured to optimize the objective function as an approximated objective function:

$$\overline{\mathcal{O}}(\mathcal{D}_{triplet}, W) = \left( \left\lfloor \frac{M}{s} \right\rfloor \cdot \sum_{j=1}^{s} \sigma(V_{qi} - V_{qj}) \right)^{\frac{1}{r}} + \frac{\lambda}{2} \|W\|_F^2$$

where $D_{triplet}$ is a triplet of segments, W is a parameter matrix, M is a total of choices of triplets, s is a number of different segments in the triplets, $\Sigma^s_{j=1} \sigma(V_{qi}-V_{qj})$ is a soft-approximated rank of historical time series yi with respect to query $y_q$, r is a penalization parameter, and λ is a parameter controlling a tradeoff between ranking loss and regularization.

16. The system of claim 14, wherein the objective function is an approximate objective function base on a stochastic gradient descent.

17. The system of claim 10, wherein each time series sequence represents a set of sensor values ordered by time of recording.

18. The system of claim 10, wherein the corrective action is selected from the group consisting of changing a security setting for an application or hardware component of a monitored system, changing an operational parameter of an application or hardware component of the monitored system, halting or restarting an application of the monitored system, halting or rebooting a hardware component of the monitored system, changing an environmental condition of the monitored system, and changing status of a network interface of the monitored system.

* * * * *